No. 881,728. PATENTED MAR. 10, 1908.
T. A. SILVERWOOD.
TIRE FOR VEHICLE WHEELS.
APPLICATION FILED APR. 22, 1907.
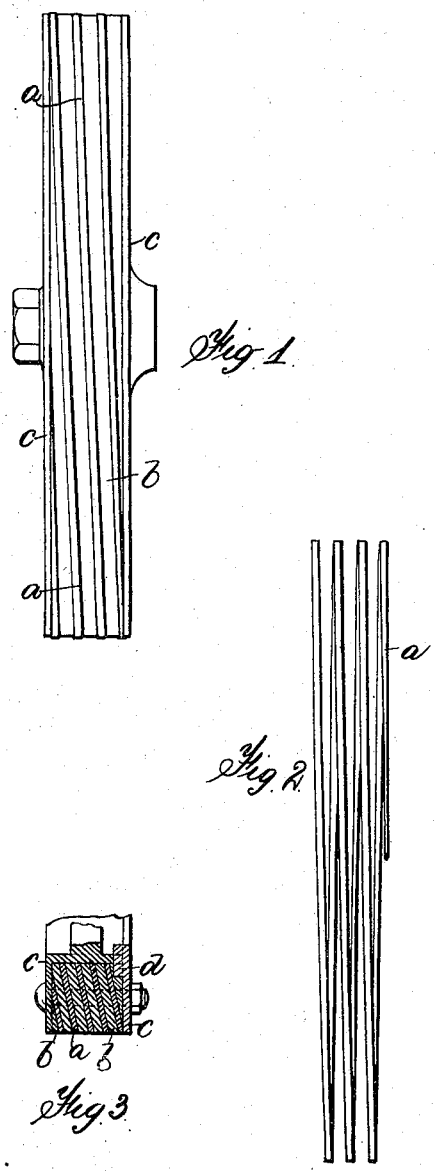

UNITED STATES PATENT OFFICE.

THOMAS ALFRED SILVERWOOD, OF LONDON, ENGLAND.

TIRE FOR VEHICLE-WHEELS.

No. 881,728.

Specification of Letters Patent.

Patented March 10, 1908.

Application filed April 22, 1907. Serial No. 369,648.

*To all whom it may concern:*

Be it known that I, THOMAS ALFRED SILVERWOOD, a subject of the King of England, residing at 32 Nicholas Lane, Lombard street, in the city of London, England, have invented certain new and useful Improvements in and Relating to Tires for Vehicle-Wheels; and I do hereby declare the following to be a full, clear, and exact description of the invention, such as will enable others skilled in the art to which it appertains to make and use the same.

This invention consists of improvements in tires for vehicle wheels and is designed to prevent side slip or skidding.

According to this invention, the tire is formed of metal, preferably of steel, helically wound, the divisions being filled in by fiber or other suitable material or compound, left to harden, thus softening the tread of the wheel, and gripping the surface of the road to obviate the side slip of the wheel. A retaining ring is fixed by bolts or otherwise to each side of the tire. In such retaining ring I fix a projection which shall take into a slot formed in the tire so as to prevent creeping.

Instead of having the ribbon steel helically wound as aforesaid I may, in some cases, find it advantageous to have flat rings of steel, with the compound placed between them. And in order that my said invention may be better understood I will proceed to describe the same with reference to the drawing accompanying this specification, in which:—

Figure 1 shows an elevation of a wheel provided with my improved tire; Fig. 2 shows ribbon steel formed into a helix; Fig. 3 shows a section through the rim of the tire.

The same letters of reference are employed to denote the same parts in all the views:—

*a* shows a ribbon of steel set on its edge and formed into a helix as shown in section, Fig. 3, and detached at Fig. 2.

*b* shows a ribbon-like fibrous or other suitable material or compound also set on edge and filled in the spaces left in the ribbon steel helix for the purpose of softening the tread and deadening the noise.

*c* shows two rings forming with the rim of the vehicle a box to receive the ribbon *c* and fibrous materials *b*, and one of which may be formed with the rim of the wheel and the other one may be suitably fixed thereon by bolts or otherwise.

*d* shows a stud or projection fixed to one of the rings *c* and taking into a slot in the tire as shown in section at Fig. 3 to prevent any liability of creeping of the tire.

In fitting wheels provided with this tire to vehicles I prefer to so fit them that the wheels on one side have a right-handed screw action and the wheels on the other side a left-handed action so that upon the vehicle tending to skid or sideslip such skidding or sideslip will be prevented by the combined action of the wheels, or on each side of the car I may have one wheel with a left-handed helix and one with a right-handed helix in certain cases.

In some cases I may find it desirable to roughen or serrate the sides of the ribbon steel or the like from which the helix or ring is formed in order to afford a grip for the filling material filled in between the coils of the metal.

What I claim and desire to secure by Letters Patent of the United States of America is:—

1. A tire for vehicle wheels composed of material in the form of a helix of ribbon material set on edge and a filling material between the layers of ribbon material, substantially as and for the purposes set forth.

2. A tire for vehicle wheels provided with a helix of ribbon steel set on edge, in combination with a fibrous material separating the coils of said helix, substantially as and for the purposes set forth.

3. In vehicle wheels the combination of the rim provided with plates forming a box, a material in the form of a helix of ribbon material set on edge, fixed in said box, and a fibrous material also having a ribbon form set on edge in said box between contiguous portions of the said ribbon material, substantially as described.

4. In a vehicle wheel, the combination of a box on the rim thereof, a spiral ribbon set on edge in said box, a fibrous material between the convolutions of the spiral and a bolt passing through the box and ribbon, substantially as described.

In testimony whereof, I affix my signature, in presence of two witnesses.

THOMAS ALFRED SILVERWOOD

Witnesses:
A. E. VIDAL,
T. C. ROWTEY.